Nov. 11, 1947.     N. T. MacKENZIE ET AL     2,430,641
PROCESS FOR TREATING LUMBER AND OTHER WOOD PRODUCTS
Filed Oct. 6, 1944     2 Sheets-Sheet 1
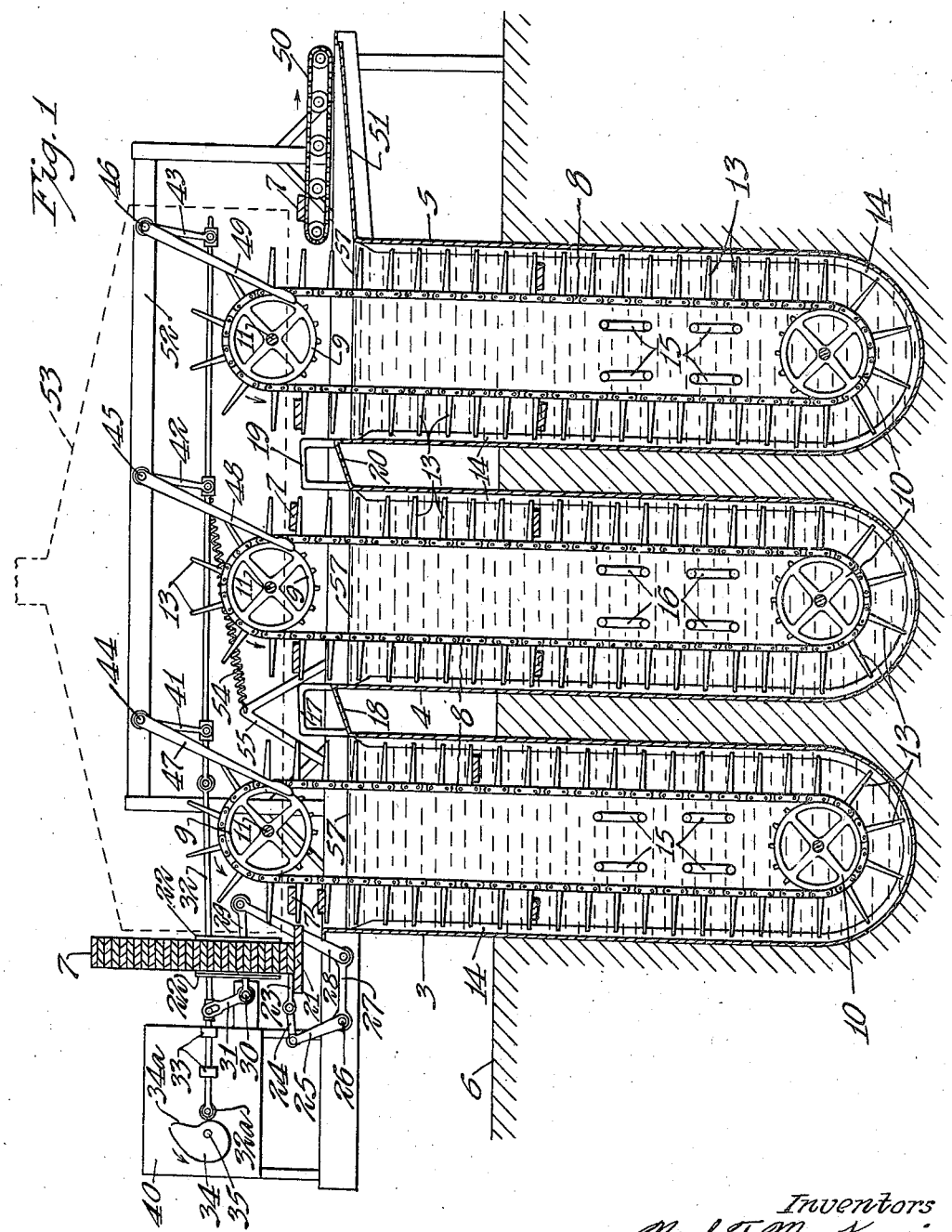
Inventors
Neal T. MacKenzie
Harry E. Hall
By John E. Snyder, Jr.
Attorney

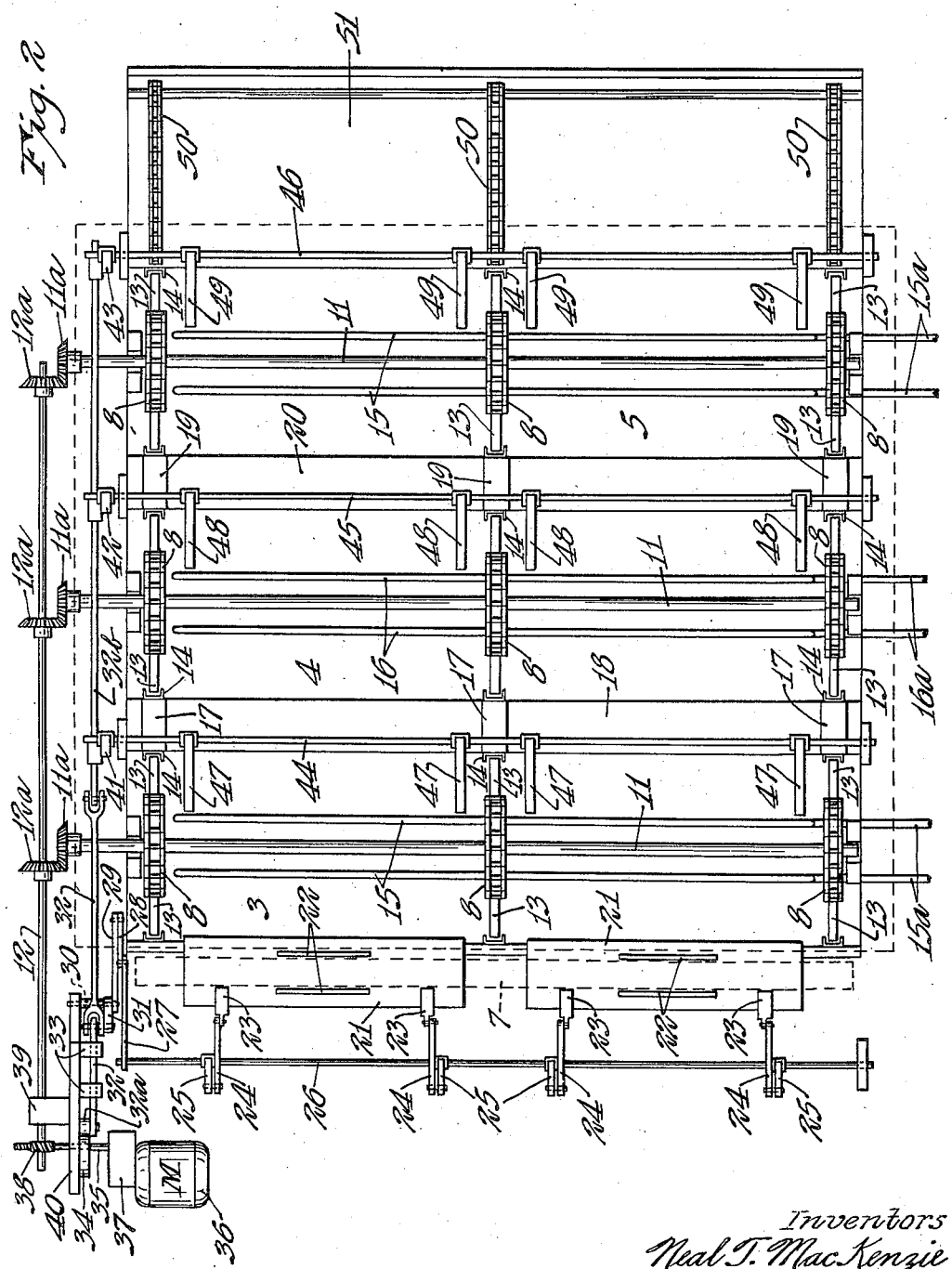

Patented Nov. 11, 1947

2,430,641

UNITED STATES PATENT OFFICE 2,430,641

PROCESS FOR TREATING LUMBER AND OTHER WOOD PRODUCTS

Neal T. MacKenzie and Harry E. Hall, St. Paul, Minn., assignors to General Timber Service, Inc., St. Paul, Minn., a corporation of Delaware Application October 6, 1944, Serial No. 557,514

5 Claims. (Cl. 117—116)

This invention relates to the treatment of lumber and other structural and finished wood members, and particularly to a continuously operable machine and process whereby the wooden members may be given uniformly thorough treatment without damage to the wood structure.

According to the commercial open tank or non-pressure method of treating wood members, two separate tanks containing treating liquid or liquids are provided and the liquid in one tank is maintained at a higher temperature than that in the other. Ordinarily the wood members are first submerged in the liquid of higher temperature until they have been heated sufficiently and then they are transferred to the cooler liquid from which a quantity of the preservative is drawn into the wood. After the absorption of preservative has progressed sufficiently, the product is withdrawn from the cooler bath and allowed to dry. With such methods the individual pieces of wood are usually spaced apart in tiers which are separated by "stickers" and bound together in bundles for convenient handling. In commercial treating plants the bundles are moved to and from the several tanks by means of power operated hoists or cranes. Since the bundles usually are of such large size that they rise to several feet in height, the component wood members near the bottom of each bundle are submerged to a substantially greater depth in the treating liquid than those which happen to be located higher up in the bundle. Consequently there is a difference in the hydrostatic pressure to which the several members in the same bundle are subjected and this has affected the uniformity of the product in that it has caused variations in both the quantity of preservative absorption and depth of penetration. Experience has shown that the time required to obtain a given absorption of preservative is a function of the depth of submersion in the bath. This is so marked that a difference of a foot or two in the depth of submersion very materially affects the time required to obtain any given degree of penetration.

It is one of the objects of the present invention to insure uniformity in the treatment of the several members treated by conveying each of them to a predetermined and adequate depth in the treatment tank or tanks while retaining them in horizontally extending, spaced relation to each other and exposing their entire surfaces to the treating liquids.

Another object is to provide a continuous process for treating wooden members in open tanks wherein the control of temperatures, time of treatment and hydrostatic pressures is such as to prevent structural damage and checking of the wood surfaces while insuring rapid and uniform impregnation or conditioning treatment.

A particular object is to provide a novel process of the open tank type whereby checking and other structural damage to the lumber or other wooden members under treatment is prevented by heating the product in an oil bath and gradually increasing the hydrostatic pressure to a predetermined maximum and then reducing the pressure.

A further object is to provide an efficient machine for conveying the several pieces of material to be treated to predetermine common depth in one or more treating baths and for automatically timing the treatment.

Other objects will appear and be more fully pointed out in the following specification and claims.

According to the preferred form of the present invention a plurality of deep, open top tanks are provided and arranged to successively receive the wood members to be treated. The first of these tanks contains a liquid which is heated and maintained at a temperature of from 230 degrees to 280 degrees F., the liquid being an oil or mixture of oils having a boiling point above the temperature of the bath. The principal function of the first bath is to avoid injury to the wood structure while heating the lumber to a temperature sufficiently high to drive off much of the air and moisture from the wood within the range of penetration required. The several wood members are introduced into the first tank and moved gradually downward therein to the required depth and then returned to a discharge point at the top, thus gradually increasing and then decreasing the hydrostatic pressure applied to each unit during the treatment. Following such submersion in the first tank the members may be transferred rapidly to the cooler bath of the second tank in the event that the treatment in a second bath is required.

The second tank may contain a wood preservative, fire retarding agent or any other material with which it is desired to impregnate the wood, or the second tank may contain a liquid which will react with the liquid carried over from the first bath to condition the wood for any purpose. To cause rapid impregnation, it is usually desirable to control the temperature of the second bath so that it is maintained substantially below 212 degrees F. This causes the preservative or other liquid of the second bath to be drawn into the wood. The several pieces under treatment are conveyed gradually toward the bottom of the second tank and are then returned upward to be discharged at the top, thus subjecting each piece to the maximum depth of submersion. During this treatment in the second tank, as well as that in the other tank, the time of submersion may be determined either by the speed of travel or length of the path traveled in the liquids, being sufficiently prolonged to insure the desired penetration and quantity of impregnation or other treatment.

Upon the discharge of the product from the second bath it is often desirable to carry the treatment further. For example, after impregnation with a preservative in an oil solution, as the product emerges from the second bath it has been found that there is an excess of preservative and oil upon and near the surfaces of the wood members which should be removed, except in special cases where a thick coating is desirable. This excess may be removed by passing the product through a third oil bath which is maintained at a sufficiently high temperature to evaporate or dissolve the excess of solvent and preservative. In other cases the third tank may be used merely as a drying chamber, or for other types of treatment, the third tank may be supplied with a liquid which is chemically reactive with the liquid of one of the preceding baths to leave a product of the reaction in the wood or on the surfaces of the wood members. Ordinarily the product is conveyed through the third bath, is discharged therefrom and, after being allowed to drain and cool for a short period of time, is in a relatively dry, workable condition. Since our process is a continuous one, it will be evident that treatment in additional tanks as may be required does not materially increase either the cost or rate of producing treated lumber.

To illustrate one specific type of treatment, the following example is given. As the preservative, a polychlorophenol, such as pentachlorphenol, may be used in a 5% solution with an oil carrier such as a petroleum oil or a mixture of oils having a suitable boiling point. In this case relatively viscous oils are used in the hot baths of the first and third tanks and a relatively nonviscous oil solvent having a relatively low boiling point is preferably used in the second or cold treatment tank. This promotes rapid and thorough penetration of the preservative and facilitates the removal of the excess solvent when the product is passed through the final hot bath. Where a preservative which is fairly stable at the temperature of the hot bath is used, a quantity of it may be placed in these baths in the same proportion as in the cooler bath, thus avoiding dilution of the cooler bath by oil carried over from the first bath and simplifying control of the preservative concentration. A 5% solution of pentachlorphenol in a suitable petroleum oil has been found to impart good protection against attack by the ordinary insects and fungi which are most destructive to wood products and also to impart a fair degree of resistance to fire when each unit of the product is submerged in such solution according to this invention.

For the purpose of illustration but not to limit the invention, reference is had to the accompanying drawing in which:

Figure 1 is a diagrammatic central vertical section showing a machine of a preferred type for carrying out our invention, and Fig. 2 is a diagrammatic plan view of the machine.

As illustrated, we provide tanks indicated by the numerals 3, 4 and 5 of similar shape and disposed closely adjacent to each other. These tanks are open at the top and extend several feet below the surface 6 of the ground or floor. Each of these tanks has a rectangular top opening which is long enough to receive the wood members 7 to be treated in horizontally extending position. Suspended within each of the tanks is a conveyor comprising a series of endless chains 8 severally trained on an upper sprocket wheel 9 and lower sprocket wheel 10. A horizontally extending shaft 11 supports and is keyed to the group of sprocket wheels 9 above each tank, this shaft being supported in turn in suitable bearings and arranged to be driven by bevel gears connecting it to a shaft 12.

Projecting at regularly spaced intervals from each of the chains 8 are arms 13 adapted to carry the wood members 7 into and through the liquid in the respective tanks. These arms are arranged in horizontal rows so that the members 7 may be supported and confined in spaced parallel relation to each other while being submerged in the several baths. The chains 8 and arms 13 are guided within the several tanks by fixed members similarly arranged and including channel guides 14 severally extending in vertical planes on the walls and across the bottoms of the tanks so that the outer ends of the arms 13 carried by each chain 8 are guided in one of the channel guides 14. The bottom of each tank is preferably semi-cylindrical in shape and concentric with the sprocket wheels 10 which operate therein, as indicated in Fig. 1. To afford means for controlling the temperature of the several baths, we provide pipe coils 15 in the tanks 3 and 5 adapted to be supplied with steam through pipes 15a and coils 16 in the tank 4 adapted to be supplied with brine or other cooling medium through pipes 16a.

To support the wood members 7 as they are moved from the tank 3 to the tank 4, we provide skids 17. These skids allow the excess of liquid to drain from the members 7 to a sloping member 18 which returns the liquid to the tank 3. By a similar arrangement of skids 19 the members 7 are supported as they are moved from the tank 4 to the tank 5 and a member 20 is provided to return the excess liquid to the tank 4.

Extending along the side of the tank 3 opposite the skids 17 is a feed table 21 and magazine having guide walls 22 adapted to support a stack of the members 7 to be treated. These members are fed one at a time from the bottom of the stack by suitable feeding mechanism, including a series of push fingers 23 to which are imparted a horizontal reciprocating movement across the top of the table 21. Each finger 23 is carried by an arm member 24 which is pivotally connected to an arm member 25 extending generally upward from a horizontal shaft 26 on which the member 25 is fixed. A crank arm 27 is fixed on the shaft 26 near one end of the latter and is joined by a link 28 to a crank arm 29 fixed on a shaft 30. A second crank arm 31 extends upward from the shaft 31 and is arranged to be actuated by a horizontally extending shaft 32 with which it has a pivotal connection. Shaft 32 is supported for horizontal reciprocating movement in bearings 33 and is arranged to be actuated by a cam 34 engaging a roller 32a mounted on an end of the shaft 32. A shaft 35 drives cam 34 and power for driving the shaft 35 is derived from a motor 36 (Fig. 2) which is connected to the shaft 35 through speed reducing gearing in a casing 37.

Connections for operating the conveyor shaft 12 in timed relation to the cam 34 include a worm 38 fixed on the shaft 35 and in mesh with a worm wheel fixed on the end of the shaft 12. The latter shaft is supported in a bearing 39 and the several bearings for the shafts 12, 32 and 35 are supported on a frame indicated diagrammatically at 40. Bevel gears 12a are fixed on the shaft 12 to severally drive similar gears 11a fixed on the respective conveyor shafts 11.

Our mechanism for transferring the several wood members from one tank to another includes a continuation 32b of the shaft 32 which extends along an end of the tanks 3, 4 and 5 and crank arms 41, 42 and 43 severally depending from and fixed on horizontally extending shafts 44, 45 and 46, and having pivoted connections with the shaft continuation 32b. Depending from the shaft 44 is a series of arms 47 having their lower ends arranged to move the members 7 from the conveyor arms 13 as they emerge from the tank 3 across the skids 17 to the arms 13 descending into the tank 4. Arms 48 fixed on the shaft 45 operate in a manner similar to the arms 47 to transfer the members 7 from the upwardly moving reach of the conveyor operating in the tank 4 to the downwardly moving reach of the conveyor operating in the tank 5. Similar arms 49 are fixed on the shaft 46 to remove the members 7 from the upwardly moving reach of the conveyor in the tank 5 to discharge conveyor 50, operating above a drain table 51. The table 51 slopes toward the tank 5 to return such liquid to the tank as is drained from the impregnated product. The mechanism for operating the arms 47, 48 and 49 is supported on a suitable frame, such as that indicated at 52 in Fig. 1. To collect and condense water vapor and objectionable fumes from the several tanks, a hood such as that indicated in broken lines at 53 may be provided. A spring 54 (Fig. 1) is anchored at one end on a frame member 55 and connected at its other end to the shaft continuation 32b so that the shaft 32 is urged toward the cam 34 and the roller 32a is held in rolling contact with the periphery of the cam.

*Operation*

In operation, the several tanks are supplied with liquids 57 of the character required for the treatment in the several tanks. It will be evident that the rate of travel of the members 7 in the liquids is correlated to the time required for the treatment. For ordinary preservative treatment, submersion of each member to a maximum depth of from five to ten feet is usually sufficient where the total time of submersion in each tank is from one-quarter to three-quarters of an hour. For example, ordinary soft wood lumber may be given excellent preservative treatment for most uses by submersion in a 5% solution of pentachlorphenol to a maximum depth of about eight feet for a total time of submersion in each tank equal to approximately one-half hour. For such treatment the chains 8 are operated at the rate of approximately seven inches per minute.

Rapid transfer of the wood members from the tank 3 to the tank 4 is necessary to avoid cooling during the transfer and to obtain maximum absorption of the preservative from tank 4. We provide such rapid transfer by operating the arms 47 with the quick motion imparted by the relatively high speed of the cam 34 as compared with the speed of the chains 8. The roller 32a engages the high point on the periphery of the cam 34 at the end of the forward stroke of the arms 47, 48 and 49 and continues substantially radially inward along the radial segment 34a of the cam to cause a quick reverse movement of the transfer arms, thus avoiding interference with the succeeding members 7 on the rising reaches of the conveyors.

In preparation for treating wood members the several tanks 3, 4 and 5 are supplied with required treating and impregnating liquids. To provide for the impregnation with pentachlorphenol as hereinbefore specifically described, the baths in the tanks 3 and 5 are heated to the desired temperatures above 212 degrees F. before starting the conveying and transferring mechanism. Now the conveyor is placed in operation by starting the motor 36 so that the cam 34 and driving sprocket wheels 9 are rotated continuously in the directions indicated by arrows in Fig. 1. With a supply of the lumber or other wood members 7 to be treated in place in the magazine on the table 21, upon each revolution of the cam 34 the fingers 23 are operated to feed one of the members 7 horizontally to a position where it is supported on a horizontal row of the arms 13. Movement of the chains carrying these arms is correlated to the speed of the cam 34 so that the chain advances a distance corresponding to the spacing of the arms 13 during each revolution of the cam 34.

By this arrangement, a member 7 is fed between each horizontal row of the arms 13 as the latter move downward carrying the members 7 into the hot bath and continuing downward to the predetermined maximum depth of submersion. From the bottom of the tank 3 the members 7 are guided at a controlled rate of speed upward along the rising reach of the chains 8. As each heat treated member 7 reaches the elevation of the skids 17 it is transferred from its position on the arms 13 laterally over the skids 17 to a position where it is supported on the arms 13 of the descending reach of the conveyor in tank 4. This conveyor operates in a manner which will now be obvious to carry a succession of the members 7 substantially to the bottom of the tank 4, then upward along the rising reach of this conveyor while the impregnating liquid is drawn into the wood from the relatively cold bath in this tank. As the heated lumber tends to heat the liquid in the tank 4, the temperature of this bath may be controlled and maintained at the desired degree by passing a cooling medium through the coils 16.

Upon reaching the elevation of the skids 19 from the tank 4 the members 7 are successively transferred upon these skids to the conveyor operating in the tank 5 and the impregnated members are thereby submerged in the second hot bath. This removes the excess preservative and solvent from the product which is finally delivered to the conveyor 50 by the oscillating arms 49. The unabsorbed liquid drains from the members 7 and these members, being in a heated condition, dry rapidly. When dry, the product may be worked and decorated substantially as readily as untreated lumber. Handling of the product is also facilitated by eliminating excess surface deposits of the oily solvent or carrier for the preservative.

In cases where it is not beneficial to submerge the wood members for equal periods of time in the several treating baths the time of submersion in any tank may be reduced as compared with that in any other tank by appropriate regulation of the relative depths of the baths. For example, if a longer submersion in the impregnating tank 4 is required than in the tank 5, the surface of the hot liquid in the latter may be maintained at a lower level or a shallower tank 5 may be provided as compared with one or both of the tanks 3 and 4, without other change in the procedure or machine construction. Where the time required to heat the lumber in tank 3 is greater than the time required to impregnate it in tank 4, as is often the case with the larger dry wood members, the tank 3 may be made deeper than the tank 4 and the length of the conveyor in tank 3 may be made proportionally longer than that in tank 4. Other methods of changing the relative times and depths of submersion in the several baths will be evident to those skilled in the art. Care should be taken, however, to transfer the wood members rapidly from the bath in tank 3 to the bath in tank 4 and this is facilitated by maintaining the surfaces of the liquids in these tanks as nearly as possible at the elevation of the tops of the tanks. Sufficient liquid is added to the tanks from time to time to replace that absorbed by the wood members treated and also to replace fractions which may be vaporized and collected in the hood 53. Where a relatively thick surface coating of preservative on the product is desirable, the tank 5 may be left empty and used as a drying chamber.

An important field of use for our invention is in the drying or seasoning of green or moist lumber, timbers or other wood members. For this purpose a single deep oil bath is employed and our conveyor is arranged to gradually submerge a succession of the wood members to a predetermined depth of from 5 to 10 feet in the bath which is maintained at a temperature of from 230 to 280 degrees F. The immediate effect of such treatment is to greatly reduce the moisture content of the members in a remarkably short time without causing surface checking or other damage to the wood structure. Green lumber in the smaller dimensions, for example, may be caused to lose a large portion of its moisture content by submerging it in oil according to the present invention for periods of from one-half hour to one hour. The product is then withdrawn from the hot bath and allowed to drain and cool. This treatment causes very little impregnation and the small amount of oil remaining on or near the surface of the wood has the beneficial effect of minimizing surface checking during the subsequent air drying.

It will now be evident that according to our process each of the several wood members may be given identically the same treatment both with respect to the depth of submersion and time of submersion. Since the machine requires no handling of the product between the feed table 21 and discharge conveyor 50 and the duration of the treatment is automatically regulated by the speed of operation of the machine and relative depths of the baths, it eliminates most of the manual labor and supervision usually required, together with human errors or variations in operation attendant upon manually controlled processes generally. As compared with the equipment required for the pressure treatment of wood members in closed retorts, the present invention also greatly reduces the investment in equipment. All of these advantageous features contribute to a reduction in the cost of the treatment while improving the quality and usefulness of the product.

Having described our invention, what we claim as new and desire to protect by Letters Patent is:

1. The process for impregnating wood members according to the open tank method which comprises, feeding said members to a tank containing a liquid comprising a mineral oil which is maintained at a temperature between 212 and 280 degrees F. and heating them by submersion in said liquid, transferring the heated wood members to a second tank containing a preservative in a mineral oil carrier which is maintained at a temperature substantially below 212 degrees F. and subjecting said members to gradually increasing and then decreasing hydrostatic pressure in said preservative and carrier by submerging each member therein to a maximum depth equal to not less than five feet while a predetermined quantity of the preservative and carrier is drawn into the wood, transferring the impregnated members to a third tank containing a hot liquid petroleum solvent for the preservative and removing the excess surface deposit of preservative and carrier from said members by submerging them in the solvent.

2. The continuous process for impregnating wood members according to the open tank method which comprises, conveying a succession of said members in spaced relation to each other within a tank containing a liquid comprising a mineral oil which is maintained at a temperature between 212 and 280 degrees F. to heat the members by submersion in said liquid, successively and continuously conveying the heated members to and within a second tank containing a liquid comprising a wood preservative and a mineral oil carrier maintaining the liquid in the second tank at a temperature substantially below 212 degrees F. and subjecting each of the wood members to gradually increasing and then decreasing hydrostatic pressure so that each of them is subjected to the same maximum pressure resulting from the submergence of each member to a depth not less than five feet and for a period of time not less than one-quarter hour in the liquid while a predetermined quantity of the liquid from the second tank is drawn into the wood and continuously removing the impregnated members from the second tank and drying them.

3. The process for impregnating wood members which comprises, heating said members by submerging them in a mineral oil bath which is maintained at a temperature between 212 and 280 degrees F., transferring the heated members to a second bath comprising a wood preservative in a petroleum oil carrier, cooling the second bath substantially below 212 degrees F., subjecting the several members therein to gradually increasing and then decreasing hydrostatic pressure to impregnate the wood by submerging each member to a predetermined maximum depth in the second bath, then transferring the impregnated members to a third bath comprising a solvent for the preservative derived from the second bath, maintaining the third bath at a temperature of from 212 to 280 degrees F. and finally removing the members from the third bath.

4. The process for impregnating wood members according to the open tank method which comprises, heating said members by submerging them in a mineral oil bath which is maintained at a temperature between 212 and 280 degrees F., transferring the heated wood members to a second bath comprising a 5% solution of pentachlorphenol in a petroleum oil carrier while maintaining the temperature of the second bath substantially below 212 degrees F., subjecting the several members to gradually increasing and then decreasing hydrostatic pressure by submerging each member in the second bath to a maximum depth of not less than five feet and returning it to the surface of the bath, then transferring the impregnated members to a third bath comprising a petroleum solvent for the pentachlorphenol, maintaining the third bath at a temperature of from 212 to 280 degrees F. to remove excess surface coating from the wood members and then removing them from the third bath.

5. The continuous process for impregnating wood members in open tanks which comprises, conveying a succession of said members within a tank containing a liquid comprising a mineral oil which is maintained at a temperature between 212 and 280 degrees F. to heat the members by submersion in said liquid to a temperature above 212 degrees F., successively and continuously conveying the heated members to and within a second tank containing a wood preservative in a liquid oil carrier to be drawn into the wood, maintaining the liquid in the second tank at a temperature substantially below 212 degrees F. and subjecting each of the wood members to gradually increasing and then decreasing hydrostatic pressure so that each of them is subjected to the same maximum pressure resulting from the submersion of each member in the liquid to a depth not less than five feet and for a period of time not less than about one-quarter hour, while a predetermined quantity of the liquid from the second tank is drawn into the wood and continuously removing the impregnated members from the second tank.

NEAL T. MacKENZIE.
HARRY E. HALL.

REFERENCES CITED

The following references are of record in the file of this patent:

UNITED STATES PATENTS

| Number | Name | Date |
|---|---|---|
| 69,260 | Seely | Sept. 24, 1867 |
| 621,774 | Chamberlain | Mar. 21, 1899 |
| 1,023,387 | Meyer | Apr. 16, 1912 |
| 2,039,393 | Coolidge et al. | May 5, 1936 |
| 2,069,491 | Hager | Feb. 2, 1937 |
| 2,355,278 | Davis | Aug. 8, 1944 |